Dec. 20, 1966 L. R. ALLEN ETAL 3,293,009

NIOBIUM STANNIDE SUPERCONDUCTOR PRODUCT

Filed May 8, 1962

*INVENTORS*
LLOYD R. ALLEN
ROBERT A. STAUFFER
DILIP K. DAS
BY
Jerry Cohen 3,293,009
Patented Dec. 20, 1966

3,293,009

NIOBIUM STANNIDE SUPERCONDUCTOR PRODUCT

Lloyd R. Allen, Belmont, Dilip K. Das, Bedford, and Robert A. Stauffer, Weston, Mass., assignors, by mesne assignments, to National Research Corporation, Cambridge, Mass., a corporation of Massachusetts Filed May 8, 1962, Ser. No. 193,281
2 Claims. (Cl. 29—193)

This application is in part a continuation of our copending application Serial No. 102,593 filed April 12, 1961.

The present invention relates to superconductive materials and more particularly to the fabrication of members employing the superconducting compound, $Nb_3Sn$. This compound has high magnetic field tolerance, under certain conditions, and can handle high current densities. However, it is very brittle and this limitation prevents its fabrication into electric circuit components.

It is therefore an object of the instant invention to provide a supreconductive $Nb_3Sn$ member which will have sufficient ductility to permit working.

It is a further object of the invention to provide a method of fabricating such an element.

These and other objects of the invention will in part be obvious and will in part appear hereinafter.

The invention is carried into effect by providing alternating layers of niobium and tin to form a composite structure. The composite structure is cold worked, as by rolling, swaging or drawing, to produce a substantial reduction in thickness of the composite structure. The cold working is enhanced by the high ductility of the tin which acts as a lubricant between the layers of niobium. The composite structure is then heated to produce $Nb_3Sn$ diffusion layers at these interfaces. The $Nb_3Sn$ layers are very thin compared to the remaining niobium layers. The heating for diffusion and reaction also serves to anneal the unreacted niobium. The composite structure thus provides a ductile, superconducting element using $Nb_3Sn$ which is capable of being further fabricated. The multiplication of thin $Nb_3Sn$ layers provides a high current carrying capacity at high magnetic fields. The larger initial dimensions of the layers afford ease of assembly and the reduced final dimensions are suitable for small electrical components. The longitudinal stretching during cold work produces clean interfaces of niobium and tin, without exposure to atmosphere or contaminants. This improves the wetting of the niobium by tin leading to greater uniformity of the resulting $Nb_3Sn$ layers, after heating.

The invention accordingly comprises the product possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 2:
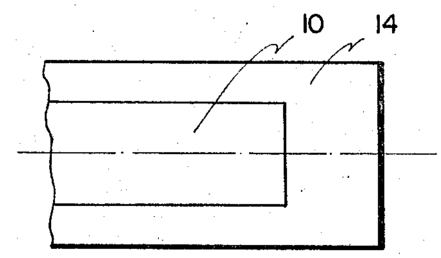
FIG. 2 is a top view of the FIG. 1 embodiment.
Figure 1:
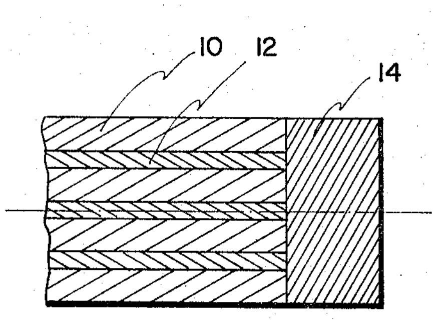
FIG. 1 is a sectional view of a first preferred embodiment of the invention.

In the preferred embodiment of the invention shown in FIG. 1 alternating layers of 20 mils thick niobium sheet 10 and 10 mils thick tin sheet 12 are interleaved. The interleaved sheets are fitted with a "picture frame" 14, as shown in FIGS. 1 and 2. While four niobium sheets and three tin sheets are shown in this example, for illustration, a larger number of sheets, e.g. 40 niobium and 39 tin sheets would be used in practice. The composite thickness is reduced in a rolling mill by being cold rolled through several passes, each pass reducing the thickness by a factor of 5–6% until the thickness is halved. The picture frame is trimmed off and the rolled composite is placed in a vacuum furnace and heated to a temperature of 900° C. at a pressure of about 10 microns Hg abs. It is held at this temperature for 64 hours. This heating causes the tin to diffuse into the niobium and promotes reaction between the niobium and tin to form $Nb_3Sn$. Additionally, this heating serves to partially anneal the niobium, thus restoring some of the ductility lost in cold working. In a variation of this embodiment, the alternating elements may be arranged as concentric cylinders with the cold work applied by swaging.

Figures 3, 4:
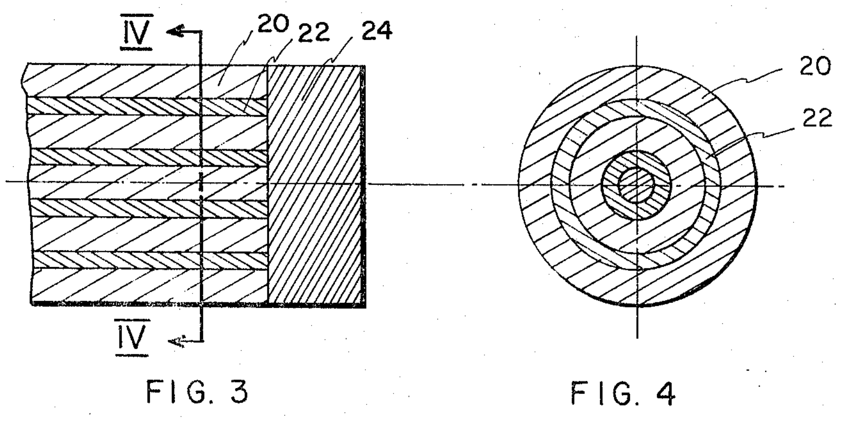
FIG. 3 is a sectional view of a second preferred embodiment.
FIG. 4 is a cross-section taken along the line IV—IV in FIG. 3.

In a second preferred embodiment of the invention shown in FIGS. 3 and 4, a composite wire formed of alternating layers of niobium 20 and tin 22 is formed. A niobium rod, two niobium cylinders and two tin cylinders are used. A cap 24 is secured on the end of the composite wire. The wire is drawn through dies in several passes, each pass reducing the diameter 5–6% until a reduction in diameter in excess of 50% is obtained. The wire is heated in the same manner as the sheet of FIGS. 1–2 to produce a ductile, superconductive wire. Generally, many more alternating layers will be used as indicated above with respect to FIGS. 1–2.

Figure 5:
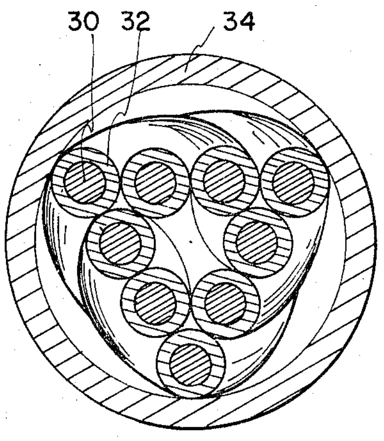
FIG. 5 is a sectional view of a third preferred embodiment.

In a third preferred embodiment shown in FIG. 5, nine wires 30 are tightly braided. Three braids of three are, in turn, braided. Each wire consists of a niobium core 30 with a thin (less than .0003 inch thick) coating 32 of tin. The coating may be achieved by electroplating or other conventional coating methods. The ductility of the niobium permits braiding. In order to increase the contact area between niobium and tin some uncoated niobium wires may be included in the braid. The tight braid is enclosed by a niobium cylinder 34 and capped. The cylinder is drawn through dies in several passes, each reducing its diameter 5–6% until a substantial reduction in diameter, in excess of 50% is achieved. The cylinder is then heated as in the previous embodiments. While the use of the outer cylinder is preferred, the braid may be used without it. The outer cylinder prevents tin from being squeezed out of the composite and affords more niobium-tin contact area.

In all of the above embodiments an additional layer of tin may be coated on the outside niobium surface to lubricate it during cold work. The invention may be practiced with a single coating of tin on a niobium wire if care is taken to avoid stripping the tin during cold work and wire drawing dies with long approach paths are used.

Numerous modifications of the above embodiments may be practiced without departing from the spirit of the invention. For example, the niobium elements could be niobium coated materials such as stainless steel with a niobium jacket. It is only necessary that there be sufficient niobium left after the niobium-tin reaction to provide ductility. The amount of thickness reduction can be varied so long as tight packing of the layers is achieved.

Since certain changes may be made in the above product and process without departing from the scope of the invention herein involved, it is intended that all matter contained in the above description, or shown in the accompanying drawing, shall be interpreted as illustrative and not in a limiting sense.

What is claimed is:

1. A superconductive wire comprising a plurality of component individual niobium wires jointly encased in a niobium sheath, continuous stannide layers being dispersed among the niobium wires in the form of diffusion coatings on the wire surfaces.

2. The article of claim 1 wherein the wires are braided.

References Cited by the Examiner

UNITED STATES PATENTS

| | | | |
|---|---|---|---|
| 2,215,477 | 9/1940 | Pipkin | 29—193 |
| 2,305,555 | 12/1942 | Peters et al. | 29—193 |
| 2,691,815 | 10/1954 | Buessenkool | 29—194 |
| 2,727,301 | 12/1955 | Magnus | 29—498 |
| 2,779,999 | 2/1957 | Boam | 29—498 |
| 2,853,768 | 9/1958 | Boucek | 29—194 |
| 2,913,813 | 11/1959 | Homer | 29—194 |
| 2,930,105 | 3/1960 | Budd | 29—195 |
| 2,982,019 | 5/1961 | Drummond | 29—194 |
| 3,036,674 | 5/1962 | Branin | 29—195 X |
| 3,116,981 | 1/1964 | Sayre | 29—194 X |
| 3,181,936 | 5/1965 | Denny et al. | 29—194 |

HYLAND BIZOT, *Primary Examiner.*